(12) United States Patent
Yagi

(10) Patent No.: US 7,566,091 B2
(45) Date of Patent: Jul. 28, 2009

(54) OPENING PORTION STRUCTURE

(75) Inventor: Takanori Yagi, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/598,692

(22) Filed: Nov. 14, 2006

(65) Prior Publication Data

US 2007/0108794 A1    May 17, 2007

(30) Foreign Application Priority Data

Nov. 15, 2005    (JP)    ............................... 2005-330166

(51) Int. Cl.
B60J 5/00    (2006.01)
(52) U.S. Cl. ..................... 296/146.6; 49/502
(58) Field of Classification Search .............. 296/146.6, 296/187.12, 146.5, 203.03, 146.7, 146.9, 296/146.2, 146.1, 187.05, 187.2; 46/502; 49/502

See application file for complete search history.

(56) References Cited

U.S. PATENT DOCUMENTS

| | | | | |
|---|---|---|---|---|
| 4,689,916 A * | 9/1987 | Shimizu | ....................... | 49/502 |
| 4,910,914 A * | 3/1990 | Asoh | ............................. | 49/214 |
| 5,033,236 A * | 7/1991 | Szerdahelyi et al. | .......... | 49/502 |
| 5,339,488 A * | 8/1994 | Maass | .......................... | 49/502 |
| 5,544,448 A * | 8/1996 | Mass | ............................ | 49/377 |
| 5,570,922 A * | 11/1996 | DeRees et al. | ........... | 296/146.6 |
| 5,573,297 A * | 11/1996 | DeRees et al. | ........... | 296/146.6 |
| 5,865,496 A * | 2/1999 | Odan et al. | .............. | 296/146.6 |
| 5,964,063 A * | 10/1999 | Hisano et al. | ................. | 49/502 |
| 6,302,472 B1 * | 10/2001 | Rahmstorf et al. | ....... | 296/146.5 |
| 6,302,473 B1 * | 10/2001 | Weber | ..................... | 296/146.6 |
| 6,381,906 B1 * | 5/2002 | Pacella et al. | ................. | 49/502 |
| 6,571,515 B1 * | 6/2003 | Samways et al. | .............. | 49/502 |
| 6,668,490 B2 * | 12/2003 | Hock et al. | .................. | 49/502 |
| 6,676,324 B1 * | 1/2004 | Pleiss | ...................... | 296/146.7 |
| 6,969,107 B2 * | 11/2005 | Omori et al. | ............. | 296/146.6 |
| 7,198,319 B2 * | 4/2007 | Schroder et al. | ......... | 296/146.7 |
| 2006/0101720 A1 * | 5/2006 | Zimmerman et al. | ......... | 49/502 |
| 2006/0168892 A1 * | 8/2006 | Dohles et al. | ................. | 49/502 |
| 2006/0264554 A1 * | 11/2006 | Lustiger et al. | ............. | 524/451 |
| 2007/0029765 A1 * | 2/2007 | Ochiai et al. | ............. | 280/730.2 |
| 2007/0046000 A1 * | 3/2007 | Sato et al. | ................ | 280/730.2 |
| 2007/0120394 A1 * | 5/2007 | Nakamori et al. | ........ | 296/146.6 |
| 2007/0199248 A1 * | 8/2007 | Rieder et al. | .................. | 49/502 |

FOREIGN PATENT DOCUMENTS

JP    2002-154322 A    5/2002

* cited by examiner

*Primary Examiner*—Kiran B. Patel
(74) *Attorney, Agent, or Firm*—Foley & Lardner LLP

(57) ABSTRACT

An opening portion structure in which an opening portion is provided between edge portions of an outer panel and an inner panel, and inner surfaces of the edge portions respectively of the outer panel and the inner panel are reinforced by an outer reinforcement and an inner reinforcement, wherein a terminal end portion of the outer reinforcement in a longitudinal direction is coupled to the inner panel at a position between an end wall of the inner panel and a terminal end portion of the inner reinforcement in the longitudinal direction.

5 Claims, 3 Drawing Sheets

OPENING PORTION STRUCTURE

BACKGROUND OF THE INVENTION

1. Field of the Invention

The present invention relates to an opening portion structure in which an opening portion is provided between edge portions of an outer panel and an inner panel.

2. Description of the Related Art

As an opening portion structure in which an opening portion is provided between edge portions of an outer panel and an inner panel, for example, a structure of a door waist portion is conceivable. In the door waist portion, the opening portion is provided between upper edge portions of a door outer panel and a door inner panel. In the opening portion, an elongated opening extended along the upper edge portions of both of the panels is formed, and a door glass is adapted to move up and down in the opening. The opening is provided over a substantially overall width of both of the panels. Accordingly, rigidity of the opening portion in a direction where the door outer panel and the door inner panel come close to or separate from each other, that is, in a direction perpendicular to longitudinal and depth directions of the opening (hereinafter, referred to as an opposing direction) is decreased. Then, air tightness and glass retention between a waist weatherstrip provided on a peripheral edge of the opening and the door glass which moves up and down in the opening are decreased. In order to prevent such a decrease, it is necessary to increase the rigidity of the opening portion.

Japanese Patent Laid-Open Publication No. 2002-154322 discloses a structure of a door waist portion, in which an outer waist reinforcement and an inner waist reinforcement are attached onto upper inner surfaces of the door outer panel and the door inner panel, respectively, and the upper inner surfaces are thereby reinforced. Furthermore, in this structure, terminal end portions of the outer waist reinforcement and the inner waist reinforcement are coupled to each other with a support member interposed therebetween. According to this structure, since the terminal end portions of the outer waist reinforcement and the inner waist reinforcement are coupled to each other with the support member interposed therebetween, the rigidities of the upper portion of the door outer panel and the upper portion of the door inner panel in the opposing direction are enhanced.

SUMMARY OF THE INVENTION

According to the above-described structure, however, the support member is coupled to the door inner panel with the inner waist reinforcement interposed therebetween. Specifically, the inner waist reinforcement is interposed between the support member and the door inner panel.

Hence, a molding error of the interposed inner waist reinforcement itself, an assembly error thereof to the door inner panel, and the like are prone to decrease positional accuracies of the upper portion of the door outer panel and the upper portion of the door inner panel in the opposing direction, that is, molding accuracy of the peripheral edge portion of the opening where the door glass moves up and down. Eventually, it becomes difficult to ensure high air tightness and sufficient glass retention between the waist weatherstrip and the door glass which moves up and down in the opening.

The present invention has been made in consideration for the above-described problems. It is an object of the present invention to provide an opening portion structure in which the outer reinforcement is coupled to the inner panel without interposing the inner reinforcement therebetween, thus making it possible to enhance the positional accuracies of the edge portion of the outer panel and the edge portion of the inner panel, which is opposite thereto, in the opposing direction.

An aspect of the present invention is an opening portion structure in which an opening portion is provided between edge portions of an outer panel and an inner panel, and inner surfaces of the edge portions respectively of the outer panel and the inner panel are reinforced by an outer reinforcement and an inner reinforcement, wherein a terminal end portion of the outer reinforcement in a longitudinal direction is coupled to the inner panel at a position between an end wall of the inner panel and a terminal end portion of the inner reinforcement in the longitudinal direction.

BRIEF DESCRIPTION OF THE DRAWINGS

The invention will now be described with reference to the accompanying drawings wherein.

DETAILED DESCRIPTION OF THE PREFERRED EMBODIMENTS

Figure 1:
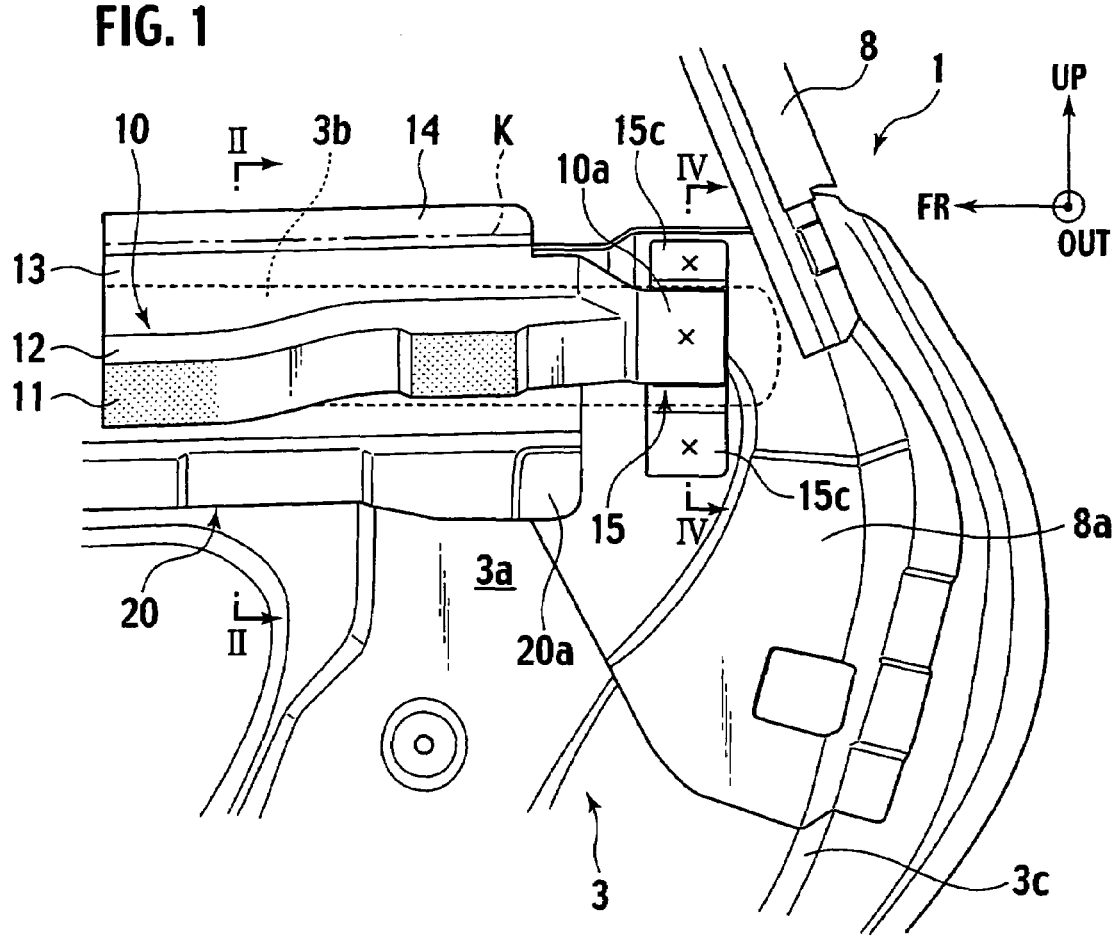
FIG. 1 is a main portion side view of a rear of a door waist portion according to a first embodiment of the present invention, in which a door outer panel is detached for clarity.

Embodiments of the present invention will be explained below with reference to the drawings, wherein like members are designated by like reference characters.

FIGS. 1 to 4 show a first embodiment of an opening portion structure according to the present invention.

Figure 2:
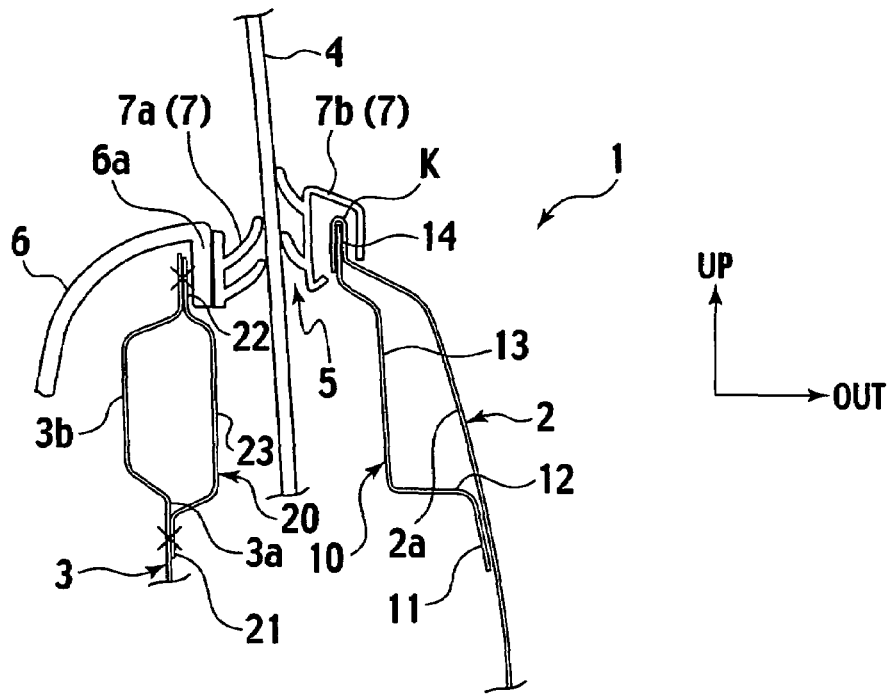
FIG. 2 is a cross-sectional view of the door waist portion along a line II-II in FIG. 1.

As shown in FIG. 1 and FIG. 2, this embodiment is an example where the opening portion structure of the present invention is applied to a door waist portion of a side door 1, such as a front door and rear door of the vehicle, installed on a side surface of a vehicle. An opening portion 5 is provided between a door outer panel 2 and a door inner panel 3, which is assembled to the door outer panel 2. The opening portion 5 has an elongated opening. The elongated opening is defined between an upper edge portion of the door outer panel 2 and an upper edge portion of the door inner panel 3. The upper edge portion of the door inner panel 3 is disposed opposite and substantially parallel to the upper edge portion of the door outer panel 2. Moreover, the elongated opening is extended along both of the edge portions. In addition, a door glass 4 is adapted to move up and down in an inside of the opening. A side surface (left side surface in FIG. 2) of the door inner panel 3 in a vehicle cabin is covered with a door trim 6.

Onto an upper inner surface (surface of the edge portion, which is opposite to the door inner panel 3) 2a of the door outer panel 2, a long outer waist reinforcement 10 is attached over a substantially overall length of the door outer panel 2 in a fore-and-aft direction or over a substantially overall width thereof in a horizontal width direction. Here, the outer waist reinforcement 10 is extended along the upper edge portion of the door outer panel 2, and since the door 1 of this embodiment is a side door, the fore-and-aft direction of each door panel substantially coincides with the horizontal width direction thereof. In such a way, an upper portion of the door outer panel 2 and the opening portion 5 are reinforced.

Onto an upper inner surface (surface of the edge portion, which is opposite to the door outer panel 2) 3a of the door inner panel 3, a long inner waist reinforcement 20 is attached over a substantially overall length of the door inner panel 3 in the fore-and-aft direction or over a substantially overall width thereof in the horizontal width direction. Here, the inner waist reinforcement 20 is extended along the upper edge portion of the door inner panel 3. In such a way, an upper portion of the door inner panel 3 and the opening portion 5 are reinforced.

The outer waist reinforcement 10 is formed into a shape having a substantially L-shaped cross section as a whole. The outer waist reinforcement 10 includes a lower flange portion 11 substantially parallel to an inner surface of the door outer panel 2; a platform portion 12 formed by bending the outer waist reinforcement 10 and thereby extended substantially horizontally from an upper end edge of the lower flange portion 11 to an inside of the door; a longitudinal wall 13 extended upward from the platform portion 12; and an upper flange portion 14 provided on an upper edge portion of the longitudinal wall 13.

The lower flange portion 11 (satin portions in FIG. 1 and FIG. 3) is adhered onto the door outer panel 2 with a mastic material. The upper edge portion of the door outer panel 2 is crimped, and the upper flange portion 14 is coupled thereto, thereby forming a hemming portion K (hereinafter, also referred to as a hemming-coupled portion K).

The inner waist reinforcement 20 is formed into a shape having a hat-shape cross section as a whole. The inner waist reinforcement 20 includes a lower flange portion 21 provided in a lower edge portion thereof, an upper flange portion 22 provided on an upper edge portion thereof, and an intermediate portion 23 having a U-shaped cross section and projected to the inside of the door between the lower and upper flange portions 21 and 22.

The inner waist reinforcement 20 is spot-welded to the door inner panel 3 at the lower flange portion 21 and the upper flange portion 22 in a state where the upper flange portion 22 is located on the upper edge portion of the door inner panel 3. Note that marks "x" in FIG. 1 to FIG. 4 indicate spot-welded points.

Moreover, on an upper end portion of the door trim 6, a bent portion 6a inserted into the opening portion 5 along the upper flange portion 22 of the inner waist reinforcement 20 is formed. Onto an inside surface of the bent portion 6a, an inner member 7a of the waist weatherstrip 7 is attached. In addition, onto the hemming-coupled portion K on the upper edge portion of the door outer panel 2, an outer member 7b of the waist weatherstrip 7 is attached. The inner member 7a and the outer member 7b hold both surfaces of the door glass 4 therebetween in a sandwiching manner with pressure.

On the portion of the door inner panel 3, onto which the inner waist reinforcement 20 is attached, an emboss portion 3b projected to the inside of the vehicle cabin (in a direction toward the door trim 6) and supporting the door trim 6 is formed so as to be extended in the fore-and-aft direction of the door inner panel 3. The emboss portion 3b and the inner waist reinforcement 20 constitute a closed cross section member with high rigidity, which is extended in the fore-and-aft direction of the door inner panel 3. A shock absorption material is disposed between the emboss portion 3b and the door trim 6, and a load to the outside of the vehicle, which is applied from the door trim 6, is adapted to be received by the highly rigid emboss portion 3b.

Figure 3:
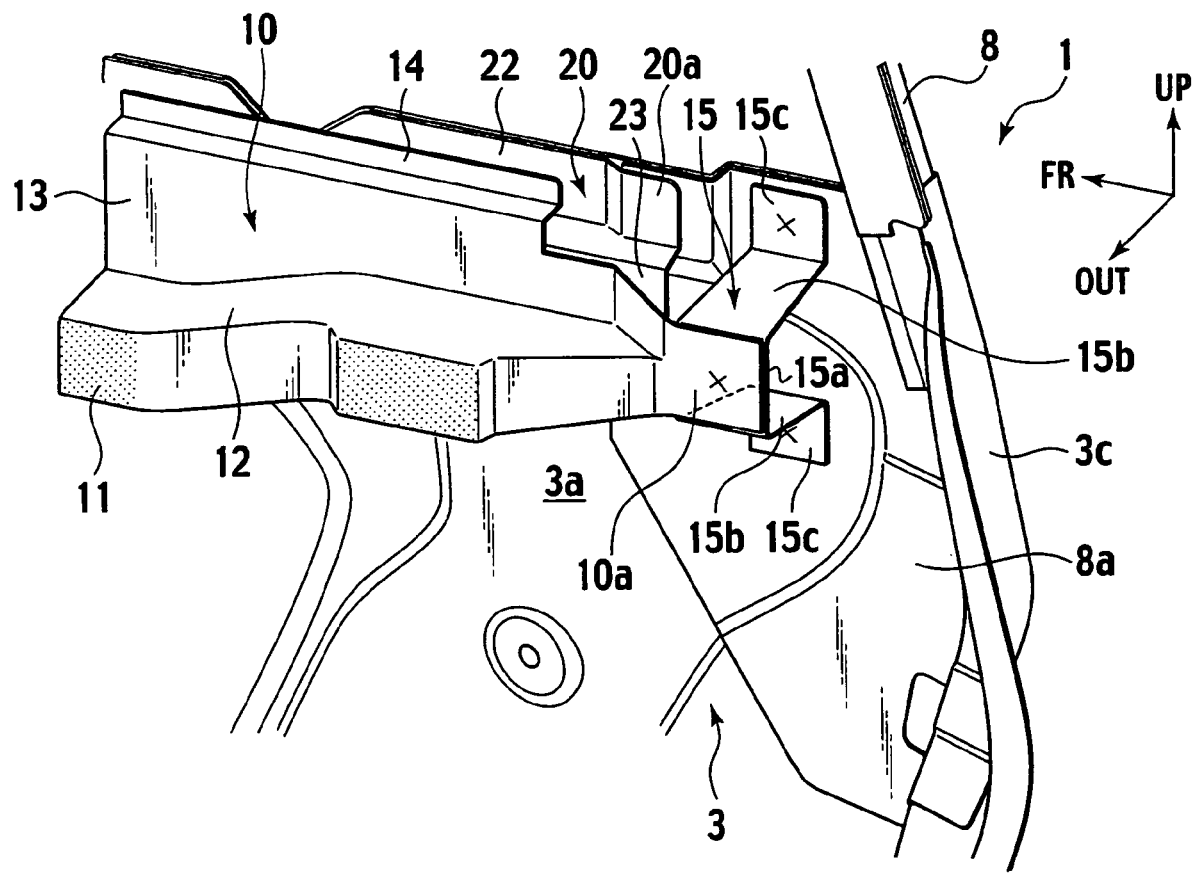
FIG. 3 is a perspective view of the rear of the door waist portion of FIG. 1, viewed from obliquely above.

Further, as shown in FIG. 1 and FIG. 3, on a rear end portion of the door inner panel 3 in the fore-and-aft direction, there is an end wall 3c formed by bending the door inner panel 3, extended toward outside of the vehicle, and coupled to a rear edge portion of the door outer panel 2. A door sash 8 is extended upward from an inner surface of an upper end portion of the end wall 3c, and a base portion 8a of the door sash 8 is joined to an inner surface 3a in the vicinity of the end wall 3c of the door inner panel 3.

A terminal end portion, specifically, a rear terminal end portion 10a of the outer waist reinforcement 10 in the longitudinal direction is coupled to the door inner panel 3 at a position between the rear end wall 3c of the door inner panel 3 and a rear terminal end portion 20a of the inner waist reinforcement 20 in the fore-and-aft direction.

In this embodiment, the terminal end portion 10a of the outer waist reinforcement 10 is coupled to the base portion 8a. Specifically, the terminal end portion 10a is coupled to a portion of the door inner panel 3, which is reinforced by the base portion 8a.

Moreover, the terminal end portion 10a of the outer waist reinforcement 10 is coupled to the door inner panel 3 while interposing a bracket 15 therebetween as a separate structural member from the outer waist reinforcement 10.

As shown in FIG. 3, the bracket 15 is formed into a shape having a hat-shape cross section. The bracket 15 includes an intermediate portion 15a coupled to a coupled portion (terminal end portion) 10a of the outer waist reinforcement 10, and a pair of leg portions 15b and 15b formed by bending the bracket 15, extended in the direction toward the door inner panel 3 from both end portions of the intermediate portion 15a in the vertical direction. The bracket 15 also includes attachment flange portions 15c and 15c formed by bending the bracket 15, extended in a direction in which the attachment flange portions 15c and 15c become apart from each other, from tip end portions of both the leg portions 15b and 15b, and attached to the door inner panel 3.

Moreover, the terminal end portion 10a of the outer waist reinforcement 10 is coupled to the vicinity of the emboss portion 3b formed in the door inner panel 3 and shown by a broken line in FIG. 1.

Figure 4:
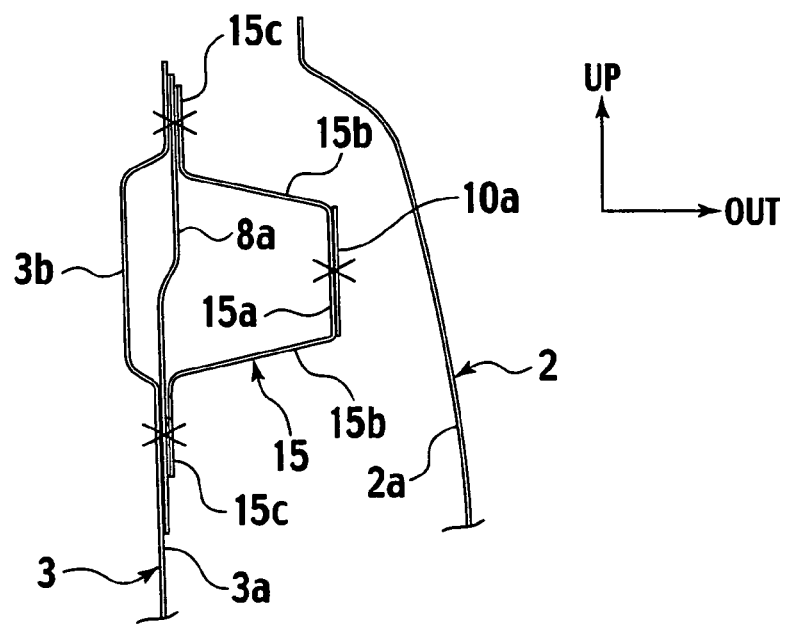
FIG. 4 is a cross-sectional view of the door waist portion along a line IV-IV in FIG. 1.

Specifically, as shown in FIG. 2, the emboss portion 3b is extended in the fore-and-aft direction in the upper portion of the door inner panel 3 while having a groove cross-sectional shape projected to the inside of the vehicle cabin. As shown in FIG. 4, the attachment flange portions 15c and 15c of the bracket 15 with the hat-shape cross section are joined to both of upper and lower edge portions of the emboss portion 3b astride across the emboss portion 3b.

As described above, according to the construction of this embodiment, the terminal end portion 10a of the outer waist reinforcement 10 is coupled to the door inner panel 3 at the position between the end wall 3c of the door inner panel 3 and the terminal end portion 20a of the inner waist reinforcement 20 in the fore-and-aft direction. Accordingly, the terminal end portion 10a can be joined to the door inner panel 3 at a portion where the inner waist reinforcement 20 is not present. The outer waist reinforcement 10, therefore, can be coupled to the door inner panel 3 without interposing therebetween the inner waist reinforcement 20 which may cause a decrease in assembly accuracy of the door outer panel 2 and the door inner panel 3.

Thus, positional accuracy between the upper edge portion of the door outer panel 2 and the upper edge portion of the door inner panel 3 in the opposing direction can be enhanced. Eventually, molding accuracy of an opening peripheral edge portion of the opening portion 5 for moving the door glass 4 up and down can be enhanced. Moreover, air tightness and glass retention between the waist weatherstrip 7 attached onto the opening peripheral edge portion of the opening portion 5 and the door glass 4 can be ensured.

Moreover, the terminal end portion 10a of the outer waist reinforcement 10, which is coupled to the door inner panel 3, is coupled to the vicinity of the emboss portion 3b formed in the door inner panel 3. Since the emboss portion 3b is highly rigid, coupling rigidity of the outer waist reinforcement 10 onto the door inner panel 3 is improved more, and eventually, the rigidity of the opening peripheral edge portion of the opening portion 5 can be further enhanced.

Furthermore, the terminal end portion 10a of the outer waist reinforcement 10, which is coupled to the door inner panel 3, is coupled to the door inner panel 3 with the bracket 15 interposed therebetween as a separate structural member therefrom. The bracket 15 formed as a separate structural member has versatility to doors of various vehicles. Accordingly, only a body portion of the outer waist reinforcement 10 corresponding to the door 1 is formed, thus making it possible to use the bracket 15 common to each of the vehicle types. Thus, a cost reduction of the vehicle can be achieved.

Still furthermore, the bracket 15 is formed, into the shape having the hat-shape cross section, with the intermediate portion 15a, the leg portions 15b and 15b, and the flange portions 15c and 15c. Accordingly, a structure of the bracket 15 is simplified, thus making it possible to provide the bracket 15 at low cost.

Moreover, in this embodiment, as shown in FIG. 1, the rear end portion of the hemming-coupled portion K between the upper flange portion 14 of the outer waist reinforcement 10 and the upper edge portion of the door outer panel 2 comes close, in the fore-and-aft direction, to the spot-welded portions of the bracket 15 to the door inner panel 3. Accordingly, it becomes possible to effectively restrict deformation of the outer waist reinforcement 10 against application of a load to the door outer panel 2, and the rigidity of the opening portion 5 can be further enhanced.

Figure 5:
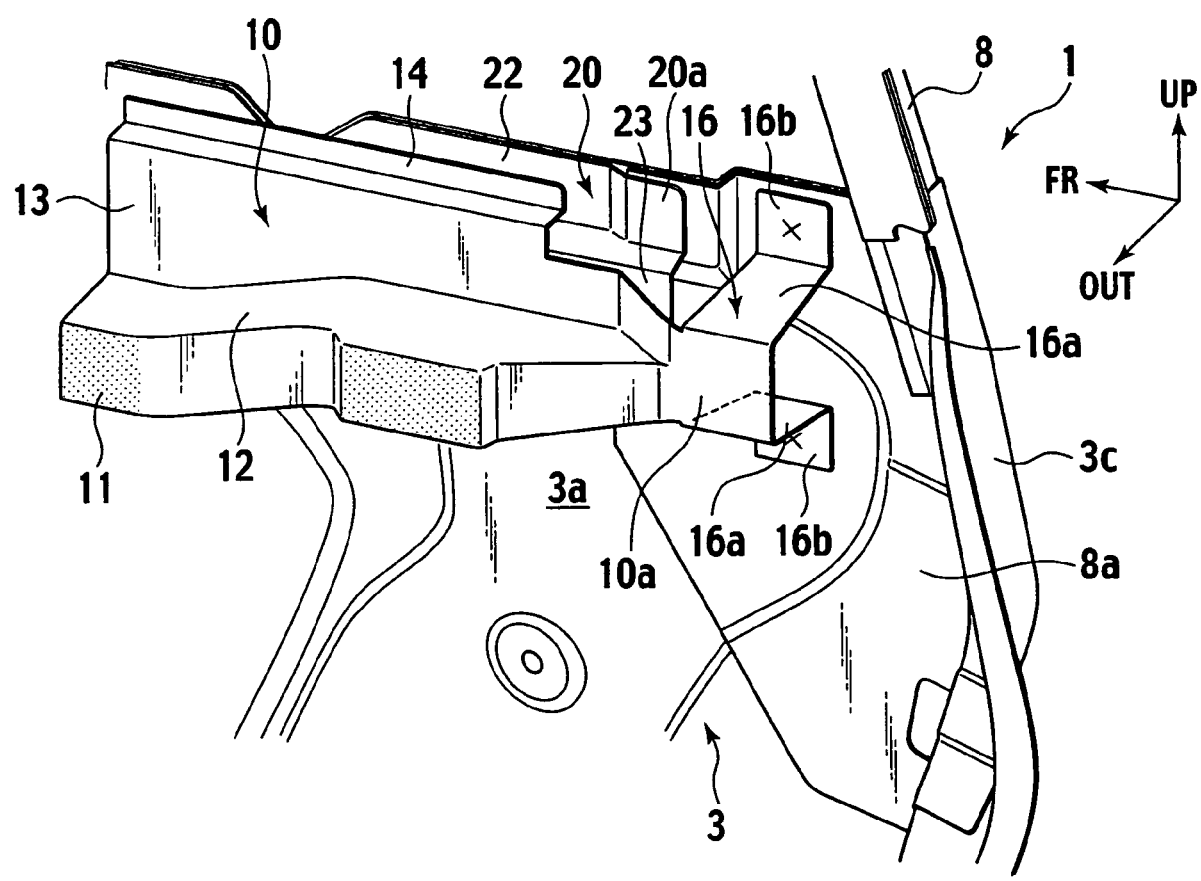
FIG. 5 is a perspective view of a rear of a door waist portion according to a second embodiment of the present invention, viewed from obliquely above, in which a door outer panel is detached for clarity.

FIG. 5 shows a second embodiment of the present invention. The same reference numerals are assigned to the same constituents as those in the first embodiment, and a description will be made of the second embodiment while omitting a duplicate description.

This embodiment basically has a similar construction to that of the first embodiment. This embodiment is also constructed in such a manner that the upper inner surfaces 2a and 3a respectively of the door outer panel 2 and the door inner panel 3 are reinforced by being attached with the long outer waist reinforcement 10 and inner waist reinforcement 20. Also, in such a manner that the rear terminal end portion 10a of the outer waist reinforcement 10 is coupled to the door inner panel 3 between the rear end wall 3c of the door inner panel 3 and the rear terminal end portion 20a of the inner waist reinforcement 20.

A particularly different point of this embodiment from the first embodiment is in that an attachment portion 16 onto the door inner panel 3, which corresponds to the bracket 15 of the first embodiment, is formed on the terminal end portion 10a of the outer waist reinforcement 10 integrally therewith.

Like the bracket 15, the attachment portion 16 is formed into a shape having a hat-shape cross section. The attachment portion 16 includes the terminal end portion 10a, a pair of leg portions 16a and 16a formed by bending the attachment portion 16, extended in the direction toward the door inner panel 3 from both end portions of the terminal end portion 10a in the vertical direction, and attachment flange portions 16b and 16b formed by bending the attachment portion 16, extended in the direction in which the attachment flange portions 16b and 16b become apart from each other, from tip end portions of both the leg portions 16a and 16a, and attached to the door inner panel 3.

Also in this case, it is preferable that the attachment flange portions 16b and 16b be joined to both of the upper and lower edge portions of the emboss portion 3b astride across the emboss portion 3b.

Hence, according to this embodiment, as in the first embodiment, the outer waist reinforcement 10 is joined to the door inner panel 3 at the portion where the inner waist reinforcement 20 is not preset, thus making it possible to enhance the molding accuracy of the opening peripheral edge portion of the opening portion 5 for moving the door glass 4 up and down. In particular, in this embodiment, the attachment portion 16 is formed integrally with the outer waist reinforcement 10. Accordingly, the number of parts is reduced, thus making it possible to reduce the number of assembly man-hours thereof.

As described above, the opening portion structure of the invention of this application is the opening portion structure in which an opening portion (5) is provided between edge portions of an outer panel (2) and an inner panel (3), and inner surfaces (2a, 3a) of the edge portions respectively of the outer panel (2) and the inner panel (3) are reinforced by an outer reinforcement (10) and an inner reinforcement (20), in which terminal end portions (10a) of the outer waist reinforcement (10) in the longitudinal direction are coupled to the inner panel (3) at positions inside both end walls (3c) of the inner panel (3) and outside terminal end portions (20a) of the inner reinforcement (20) in the longitudinal direction.

The preferred embodiments described herein are illustrative and not restrictive, and the invention may be practiced or embodied in other ways without departing from the spirit or essential character thereof. In the above-described first and second embodiments, the opening portion structure of the present invention has been described by taking as an example the case of the opening portion of the side door 1, such as a front door and a rear door, installed on the side surface of the vehicle. The opening portion, however, is not limited to the above, and just needs to be an opening portion provided between the edge portions of the outer panel and the inner panel, in which the inner surfaces of the edge portions are reinforced by the reinforcements, respectively. Hence, the opening portion structure of the invention of this application can also be applied, for example, to an opening portion provided on a back door, in which a window glass is made movable up and down therein.

Moreover, since this embodiment has been shown by taking as an example the rear portion of the door 1, the structure has been shown, in which the rear terminal end portion 10a of the outer waist reinforcement 10 is coupled to the door inner panel 3. The present invention, however, can also be applied to a front terminal end portion of the outer waist reinforcement 10, which is disposed in a front portion of the door 1. In this case, it is preferable that the front terminal end portion be coupled to the door inner panel 3 between a front end wall of the door inner panel 3 and a front terminal end portion of the inner waist reinforcement 20.

As a matter of course, the present invention may be applied to either one of the rear terminal end portion 10a and front terminal end portion of the outer waist reinforcement 10. Then, the rigidity of the opening portion 5 can be enhanced at either one thereof to which the present invention is applied.

The scope of the invention being indicated by the claims, and all variations which come within the meaning of claims are intended to be embraced herein.

The present disclosure relates to subject matters contained in Japanese Patent Application No. 2005-330166, filed on Nov. 15, 2005, the disclosures of which is expressly incorporated herein by reference in its entirety.

What is claimed is:

1. A door waist portion structure for a vehicle comprising:
a door outer panel and a door inner panel disposed opposite to each other, wherein the door outer panel and the door inner panel respectively have upper edge portions extending substantially parallel to each other in a substantially horizontal direction;
an opening portion having an elongated opening defined between the upper edge portions of the door outer panel and the door inner panel, through which a door glass moves up and down;
an outer waist reinforcement extending along the upper edge portion of the door outer panel and attached to the door outer panel, wherein the upper edge portion of the door outer panel is reinforced by the outer waist reinforcement; and
an inner waist reinforcement extending along the upper edge portion of the door inner panel and attached to the door inner panel, wherein the upper edge portion of the door inner panel is reinforced by the inner waist reinforcement,
wherein the outer waist reinforcement has a terminal end portion at one end thereof on a first side in the substantially horizontal direction and the inner waist reinforcement has a terminal end portion at one end thereof on the first side in the substantially horizontal direction,
wherein the door inner panel is formed to have, at one end thereof on the first side in the substantially horizontal direction, an end wall extending from the door inner panel toward the door outer panel, and
wherein the terminal end portion of the outer waist reinforcement is coupled to the door inner panel at a position in the substantially horizontal direction between the end wall of the door inner panel and the terminal end portion of the inner waist reinforcement.

2. The door waist portion structure according to claim 1, wherein an emboss portion is formed in the door inner panel for supporting a door trim, and
wherein the terminal end portion of the outer waist reinforcement is coupled to a vicinity of the emboss portion.

3. The door waist portion structure according to claim 2, wherein the terminal end portion of the outer waist reinforcement is coupled to the door inner panel astride the emboss portion.

4. The door waist portion structure according to claim 1, wherein the terminal end portion of the outer waist reinforcement is coupled to the door inner panel with a bracket interposed therebetween as a separate structural member from the outer waist reinforcement.

5. The door waist portion structure according to claim 4, wherein the bracket is formed in a hat-shape in cross section, and
wherein the bracket comprises:
an intermediate portion coupled to the terminal end portion of the outer waist reinforcement,
a pair of leg portions extending from both edge portions of the intermediate portion toward the door inner panel, and
flange portions extending from tip end portions of both leg portions in a direction in which the flange portions become apart from each other and are attached to the door inner panel.

\* \* \* \* \*